United States Patent
Kinnaird

(10) Patent No.: US 6,623,554 B2
(45) Date of Patent: Sep. 23, 2003

(54) PROTECTIVE COATING COMPOSITIONS CONTAINING NATURAL-ORIGIN MATERIALS, AND METHOD OF USE THEREOF

(75) Inventor: Michael Gates Kinnaird, Durham, NC (US)

(73) Assignee: Chemtek, Incorporated, Yanceyville, NC (US)

( * ) Notice: Subject to any disclaimer, the term of this patent is extended or adjusted under 35 U.S.C. 154(b) by 75 days.

(21) Appl. No.: 09/740,066

(22) Filed: Dec. 20, 2000

(65) Prior Publication Data

US 2002/0114894 A1 Aug. 22, 2002

(51) Int. Cl.$^7$ ............................................. C09D 195/00
(52) U.S. Cl. ....................................... 106/246; 106/278
(58) Field of Search ................................. 106/278, 246

(56) References Cited

U.S. PATENT DOCUMENTS

| | | | | |
|---|---|---|---|---|
| 4,022,635 A | 5/1977 | Earing | ......................... | 106/280 |
| 4,073,659 A | 2/1978 | Burris | ......................... | 106/278 |
| 4,094,696 A | 6/1978 | Burris | ......................... | 106/277 |
| 4,193,875 A | 3/1980 | Stahl et al. | ............. | 106/164.51 |
| 4,282,037 A | 8/1981 | Burris | .................... | 106/164.51 |
| 4,282,038 A | 8/1981 | Earing | ......................... | 106/276 |
| 4,437,896 A | 3/1984 | Partanen | ................. | 106/273 R |
| 4,600,635 A | 7/1986 | Wiercinski et al. | .......... | 428/220 |
| 4,621,108 A | 11/1986 | Burris | ......................... | 523/340 |
| 5,117,909 A | 6/1992 | Wilton et al. | ................ | 166/277 |
| 5,271,767 A * | 12/1993 | Light et al. | .................. | 106/246 |
| 5,534,134 A | 7/1996 | Roder et al. | ................. | 208/402 |
| 5,811,477 A | 9/1998 | Burris et al. | ................... | 524/60 |
| 6,248,396 B1 * | 6/2001 | Helf | ........................... | 427/138 |
| 6,281,189 B1 * | 8/2001 | Heimann et al. | ............ | 510/491 |

OTHER PUBLICATIONS

Stoye, Dieter and Freitag, Werner (Editors) *Paints, solvents and Coatings* Wiley–VCH, pp. 91–93, 1998 (No month provided).

"Gilsonite Selects" by the Ziegler Chemical and Mineral Corp. Not dated, No date provided.

* cited by examiner

Primary Examiner—David Brunsman

(57) ABSTRACT

A useful composition for protecting metal equipment from corrosion and/or other damage comprises 1) gilsonite, which is a mined asphalt; and/or some other natural-origin or naturally-derived resin, 2) a naturally-derived solvent such as d-limonene and/or other terpenes, and 3) a naturally-derived non-drying plasticizer such as fatty acid triglycerides. 4) Optionally, additives for controlling rheology, viscosity, lubricity, corrosion rates etc. can be added to obtain specific properties which may be desirable. The invention also relates to a method of preventing corrosion or other damage to metal equipment by applying the above-mentioned coating to the equipment by spraying, rolling and/or brushing.

5 Claims, No Drawings

PROTECTIVE COATING COMPOSITIONS CONTAINING NATURAL-ORIGIN MATERIALS, AND METHOD OF USE THEREOF

BACKGROUND OF THE INVENTION

1. Field of the Invention

This invention relates to a class of novel compositions, which are useful for protective coatings. More particularly, the invention comprises
1) gilsonite, which is a mined asphalt and/or some other natural-origin or naturally-derived resin,
2) a naturally-derived solvent such as d-limonene and/or other terpenes and
3) a naturally-derived non-drying plasticizer exemplified by many fatty acid triglycerides. Optionally, additives for controlling rheology, viscosity, lubricity, etc. can be added to obtain specific properties which may be desirable.

What makes the instant invention particularly useful is that the material is either mined directly from the ground as an inert solid, or contains naturally-derived, biodegradable, renewable materials. This makes it more "environmentally friendly" than many of the current coatings on the market, which contain petroleum solvents and/or petroleum asphalt.

Another object of the instant invention is to provide an alternative to more expensive coatings that may be used, such as epoxy coatings. The compositions are useful as protective coatings for painted or unpainted metal surfaces, such as heavy equipment, bridges, piping, tanks, etc.

This invention also relates to a method of protecting said metal surfaces, by brushing, rolling or spraying the above-mentioned composition onto the metal surfaces to be protected.

2. Prior Art

2.1. General Considerations

Corrosion of metal equipment and/or other metal objects is a multi-billion dollar a year problem. Corrosion causes failure of the corroded object, leading to down time, expensive repairs or replacement, and potential liability if the failure occurs in such a way as to harm people.

Epoxy- and similar coatings may be useful in retarding corrosion, but they are in general not easy to apply, requiring substantial effort in surface protection and care, technical expertise and effort during application. Epoxy and similar coatings also suffer from the disadvantage of high cost. Therefore, what is desirable is an effective, low-cost coating.

It is well-known in the industry that asphalt tar, alone or in combination with gilsonite and/or certain other materials form the basis of protective coatings. These coatings are useful to help metal objects to resist the corrosive effects of moisture.

However, many of the current coatings of this type on the market contain petroleum solvents and/or petroleum asphalt. This raises concerns when the coatings are used, due to the presence of such environmentally-unfriendly components.

In particular, an especial concern of many users of protective coatings, is that during application some of the coating may fall on the ground, yielding a violation of various environmental statutes which prohibit spilling or dripping oil or petroleum-derived solvents on the ground. Therefore, coatings which are derived from non-petroleum sources are desirable. It is the object of this invention to disclose such coating materials.

Another type of coating for this type involves gilsonite and drying oils, such as tung oil, in combination with dryers, which are heavy metal catalysts. This type of material tends to become embrittled over time, leading to loss of adhesion. Also, the use of heavy-metal dryers defeats the purpose of utilizing otherwise environmentally-friendly components such as naturally-derived oils.

2.2. Prior Art—Discussion

In a series of patents by Burris and/or Burris et. al. (e.g. U.S. Pat. Nos. (this notation is hereinafter referred to as "US") 4,073,659; 4,094,696; 4,193,815; 4,282,037; 4,621,108; 5,811,477) various combinations of gilsonite, asphalt and/or high-boiling petroleum fractions and/or rubber are disclosed. Some of these mixtures are prepared as emulsions, with various emulsifiers and/or mixing sequences. These compositions find utility in a variety of applications, which include coatings. However, all of these compositions have petroleum-based solvents and/or asphalt. Therefore, a more environmentally-friendly alternative is desirable, one that does not involve petroleum-based solvents and/or asphalt.

U.S. Pat. No. 4,600,635 to Wiercinski, et. al, discloses compositions which comprise bitumen, oil, an ionomeric elastomer and gilsonite, and optionally a supportive and/or water-proofing membrane. These compositions are used in various water-proofing applications, including as water-proofing coatings. These compositions also suffer from the drawback that they contain oil and/or petroleum-based solvents.

U.S. Pat. Nos. 4,022,635 and 4,282,038 to Earing, disclose an encasing system to protect electrical components against water damage, which is one desirable characteristic among others possessed by the compositions. The system comprises, among other things, gilsonite which is modified by thermal depolymerization or by the addition of a high-viscosity process oil. These materials either have to be considerably heated prior to application, or contain process oils. Thus, someone desiring a coating to be applied at room temperature or below, or wanting to avoid using petroleum-derived products in their coating, would not find these compositions desirable.

U.S. Pat. No. 5,117,909 to Wilton, et al. discloses an oil- or gas well conduit sealant and method of placing this sealant where it can reduce leakage through the conduit in which it is placed. These compositions comprise water or diesel fuel as a carrier liquid, an emulsifier, and particulate silica and/or gilsonite. A composition comprising water as the carrier for gilsonite will not result in a useful protective coating when sprayed, brushed or rolled on metal surfaces, because gilsonite is not soluble in water to any appreciable extent. Therefore, a more suitable solvent is required for many protective coating applications. Likewise, the use of diesel fuel as the carrier solvent will not satisfy the environmental constraints desired in many applications.

U.S. Pat. No. 4,437,896 to Partanen discloses synthetic asphalt mixtures comprising selective blends of tall oil and/or tall oil pitch and gilsonite, and a process of preparing them. Optionally, other ingredients may be added to this mixture, such as aggregate, petroleum asphalt, reclaimed rubber, emulsifying agents, alcohols, fiber binder. The primary advantage to the Partanen compositions is that they are not required to have petroleum asphalt in them, or have reduced amounts of it in them, so are potentially cheaper than petroleum-derived compositions. The primary applications are in paving.

To produce the Partanen mixtures, it is necessary to melt the gilsonite sometimes prior to and always after adding it to the tall oil and/or tall oil pitch, and the mixture is kept heated during processing. The resulting mixtures are generally solids at room temperature, and so would not be useful for room-temperature or below-room-temperature applications.

Partanen does disclose liquid, or "cut-back" types of compositions, using the synthetic asphalt prepared as above, and diluted with alcohols, notably glycol ethers such as polyethylene glycols and/or polypropylene glycols which are advantageous in that they are considered more environmentally-friendly than petroleum solvents. While this is so, these solvents tend to be rather expensive, so less-expensive alternatives are more desirable. Also, although the solvents are not petroleum distillates or fractions, they are not of natural origin, and so their biodegradability can be an issue. It would be advantageous to have coatings that would have solvents that are of natural origin.

U.S. Pat. No. 5,534,134 to Roder and Scriven disclose a pitch that is low in polycyclic aromatic hydrocarbons ("PAH's") and a method for making it. This composition is comprised of, among other things, coal tar pitch, petroleum pitch and gilsonite pitch. The coal tar is the primary source of the PAH's. Handling compositions containing PAH's is considered to be hazardous, due to an increased risk of cancer. The resultant pitch, due to it's lower coal tar pitch content, has lowered PAAH content than a coal tar pitch alone.

However, the combination still leaves much to be desired from an environmental standpoint. Therefore, it is still desirable to have a protective coating that has a safer toxicological and/or environmental profile.

In the book *Paints, Coatings and Solvents* edited by Dieter Stoye and Werner Freitag (Wiley-VCH), mention is made of combination paints of Gilsonite and drying oils. The merits and demerits of this type of system have already been mentioned above.

SUMMARY

An object of the present invention is to provide a composition that yields a good protective coating when applied to metal substrates, but which utilizes natural-origin or naturally-derived raw materials. This object is fulfilled by a composition comprising:

1. d-limonene or other natural-origin solvent(s) as the major solvent(s),
2. gilsonite and/or some other naturally-derived resin as the major hardening component,
3. a naturally-derived non-drying plasticizer/softening agent, exemplified by fatty acid triglycerides, and
4. other potential additives, such as
   1. Solid particles to enhance lubricity, such as molybdenum sulfide, graphite or fluorocarbon particles,
   2. Additional rust and/or corrosion inhibitors such as amines, amine salts, imidazolines, or corrosion inhibiting pigments, and/or
   3. Dispersing agents for the above.

The compositions are useful as protective coatings for painted or unpainted metal surfaces, such as heavy equipment, bridges, piping, tanks, etc.

This invention also relates to a method of protecting said metal surfaces, by brushing, rolling or spraying the above-mentioned composition onto the metal surfaces to be protected.

DESCRIPTION OF THE INVENTION

This invention relates to a composition that is useful for use as a protective coating, and the use of that composition in protecting equipment. The composition comprises:
1) a natural-origin solvent such as d-limonene as the major solvent, typically in the range of 25–95% by weight of the final formulation,
2) gilsonite and/or some other naturally-derived resinous component as the major hardening component, typically 5–50% by weight of the final formulation,
3) a naturally-derived non-drying plasticizer/softening agent, exemplified by fatty acid triglycerides, such as natural fats and oils, such that the plasticizer/naturally-derived resinous material ratio is in the range of 1/10 to 10/1, and
4) other optional, potential special-purpose additives, such as
   1) Solid particles to enhance lubricity, such as molybdenum sulfide, graphite or fluorocarbon particles,
   2) Additional rust and/or corrosion inhibitors such as amines, amine salts, imidazolines, calcium salts of alkyl- or alkaril sulfonic acids or corrosion inhibiting pigments, and/or
   3) Dispersants for the insoluble components, and/or
   4) Coupling agents for special soluble additives.

The amount of these latter special-purpose components is expected to be less than about 5–10% by weight of the total final film.

The invention utilizes a natural-origin solvent, such as d-limonene, derived from citrus- or pine processing, or other natural origin solvent. The d-limonene or other natural-origin solvent should be present in the mixture in the range of 25–95%, more preferably 40–75%, and in a most-preferred embodiment comprises 65–75% of the mixture. It has been observed that concentrations of many natural-origin resins much higher than about 25% tend to be very viscous, and handle and apply poorly.

In addition to d-limonene, other natural-origin solvents include, but are not limited to: amyl acetate, turpentine, pine oil, d,l-limonene, pine terpenes, and/or dimers or oligomers of these, and including mixtures and combinations of these.

The natural-origin solvent can potentially also be an alkyl ester derived from natural sources, including and preferably a mixture of esters of varying hydrocarbon chain lengths and degrees of unsaturation. The alcohols used to make the esters include but are not limited to methyl, ethyl, propyl, iso-propyl, butyl, isobutyl, tert-butyl, pentyl, hexyl, octyl, 2-ethylhexyl, glycerine, and longer-chain fatty alcohols. In a preferred embodiment, the alcohol is methyl or isopropyl. In a most-preferred embodiment, the alcohol is methyl.

The fatty acid(s) used as the fatty portion of potentially-useful esters are selected from one or more of the following: acetic, propionic, butyric, pentanoic, hexanoic, 2-ethylhexanoic, heptanoic, octanoic, nonanoic, capric, caproic, undecanoic, lauric, myristic, palmitic, margaric, stearic, acachidic, behenic, lignoceric, myristoleic, palmitoleic, oleic, linoleic, linolenic, licosenoic behenic and erucic phthalic, isophthalic, terephthalic, maleic, fumaric, oxalic, malonic, succinic, glutaric, adipic, pimelic, suberic, azelaic, sebacic acids and isomers and mixtures of these. The preferred embodiment acids are fatty acid mixtures primarily in the C-8–C18 range, and are naturally-derived.

Gilsonite and/or another naturally-derived resin is dissolved in the natural-origin solvent, and provides the major portion of the final dried film. Gilsonite is a naturally-occurring resin, soluble in many organic solvents. Other useful naturally-derived resins include, but are not limited to: naturally-derived pitch, terpene resins and/or modified terpene resins such as terpene-phenolic resins, terpene-styrenic resins, terpene dimer resins; or rosin(s), gum rosins, modified rosins, rosin esters, etc. The naturally-derived resin in the instant invention comprises from about 5% to about 50% of the total formulated material. In a preferred embodiment, resin comprises from about 10 to about 25% by weight of the total formulation.

Gilsonite and many naturally-derived resins are typically hard, brittle materials, so it is advantageous to blend them with softening agents. Therefore, the instant invention is rendered more useful by the addition of a plasticizer, preferably of natural origin or otherwise naturally-derived. The presence of the plasticizer renders the films substantially less brittle, significantly increasing the life expectancy thereby. A non-drying plasticizer is preferable, to avoid subsequent embrittlement of the resultant film.

Examples of useful natural-origin plasticizers include many fatty acid triglycerides, which are obtained from the food, paper, or other natural-product processing industries. The plasticizer component is present in ratio to the resin in the range of 1 part plasticizer to 20 parts naturally-derived resinous material, to 1 parts plasticizer to 1 part naturally-derived resinous material. In a preferred embodiment, the plasticizer comprises from about 5% to about 20% of the final film.

The plasticizer which is preferred is an alkyl ester, as these have the required solubility, evaporation and environmental profiles. The alcohols used to make the esters include but are not limited to methyl, ethyl, propyl, iso-propyl, butyl, isobutyl, tert-butyl, pentyl, hexyl, octyl, 2-ethylhexyl, glycerin, trimethylol propane, and/or longer-chain fatty alcohols, or in general a substance containing from about 1 to about 20 carbon atoms, and having at least one hydroxyl group.

Examples of fatty acids that find utility in the present invention as alkyl esters include caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, rosin acids, dimer acids, trimer acids, ozone acids, diacids, triacids, combinations and mixtures of these, as well as other fatty acids preferably from natural sources, the fatty portion of the acid having average carbon chain lengths from about 6 to about 60. It is to be understood that there are other possible fatty acids whose alkyl esters could find utility in this invention, the above list is representative, not exhaustive. It is also understood by those skilled in the art that mixtures and/or combinations of these will find utility. In fact, in a preferred embodiment, the plasticizers used are triglycerides that include a mixture of fatty acids.

Another major characteristic of the fatty acids that make up the natural-origin plasticizer is that they contain few components that have more than two double carbon—carbon bonds in close proximity to each other. The presence of many fatty acids that have more than two double carbon—carbon bonds in close proximity to each other causes the resultant mixtures to tend to crosslink within themselves over time, resulting in embrittlement and subsequent loss of adhesion.

Although the instant invention as outlined above has substantial water-resisting properties, and provides a useful, inexpensive protective film for metal equipment, there are going to be situations where additional properties are desired. Therefore, the instant invention is optionally improved upon by the addition of special-purpose additives.

An example of such a kind of additive is the addition of solids that are used to enhance the lubricity of the resulting film. Examples include but are not limited to graphite, molybdenum sulfide, poly-tetraflouroethylene ("PTFE"), ground waxes such as polyethylene, polypropylene, polyamid, or other polymeric waxes, or other solid lubricants.

In some cases, such additives tend to settle to the bottom of the storage container, and re-dispersion may be difficult. In that situation, the addition of dispersants may enhance the storage stability of the product. Examples of such dispersants include but are not limited to polyurethane polymeric dispersants such as EFKA 4010 by the Lubrizol Corporation, polyacrylate polymeric dispersants such as EFKA 4010 by the Lubrizol Corporation, and complex polycarbonic acid/amine oligomers such as TEGO Dispers 630, fatty acid derivatives such as TEGO Dispers 700. Other dispersing agents may do, depending on the circumstances, as will be understood by those skilled in the art.

Other potentially desirable additives may include special corrosion inhibitors. Examples include, but are not limited to, organic corrosion inhibitors such as cationic amines or imidazolines, calcium salts of certain sulfonic acids, as well as certain corrosion-inhibiting inorganic pigments such as iron oxide(s). Other corrosion inhibitors may do, depending on the circumstances, as will be understood by those skilled in the art.

In a preferred embodiment, the optional corrosion inhibitor is naturally-derived, and can also contribute to the plasticization effect that is useful to enhance the coating life expectancy. Examples include soya-based or tallow-based amines, their ethylene oxide adducts, and/or salts thereof.

EXAMPLES

Examples 1 & 2 indicate that the present invention forms protective coatings on metal surfaces.

Example 1

A protective coating was made comprising the following ingredients, with respective parts by weight:

| | |
|---|---|
| Gum Rosin "M" sold by Akzo Nobel | 1.06 |
| d-limonene from orange processing | 3.11 |
| tallow diamine sold by Tomah | 0.73 |
| premix with the below composition: | 6.0 |
| Zeco 11 gilsonite | 55 |
| d-limonene | 110 |

Zeco 11 is a grade of gilsonite sold by Ziegler Chemicals and Minerals Corp. Gum rosin M is a complex mixture containing rosin acids and/or their esters. The resulting composition was placed in contact with a clean, sanded steel plate, and showed excellent adhesion, was not tacky after drying, but was still somewhat soft, which allows for good film flexibility.

Example 2

A protective coating was made comprising the following ingredients, with respective parts by weight:

| | |
|---|---|
| Gum Rosin "M" sold by Akzo Nobel | 1.0 |
| d-limonene from orange processing | 3.0 |
| "E-18-2" ethoxylated fatty amine | 0.73 |
| premix with the below composition: | 6.0 |
| Zeco 11 gilsonite | 55 parts by weight |
| d-limonene | 110 parts by weight |

E-18-2 is an ethoxylated fatty amine sold by Tomah Products Corp. Gum Rosin M is a natural-origin rosin sold by Akzo Nobel Resins. The resulting composition was placed in contact with a clean, sanded steel plate, and showed good adhesion, was not tacky after drying, but was still somewhat soft, which allows for good film flexibility.

Example 3

A protective coating was made comprising the following ingredients, with respective parts by weight:

| | |
|---|---|
| Tall Oil Pitch | 1.0 |
| d-limonene from orange processing | 4.0 |
| premix with the below composition: | 6.0 |
| Zeco 11 gilsonite | 55 |
| d-limonene | 110 |

Tall oil pitch is a naturally-derived pitch from wood processing, and is sold by Arizona Chemical Company. It is a complex mixture of acids, esters and alcohols, among other components. The resulting composition was placed in contact with a clean, sanded steel plate, and showed good adhesion, was not tacky after drying, but was still somewhat soft, which allows for good film flexibility.

Example 4

A protective coating was made comprising the following ingredients, with respective parts by weight:

| | |
|---|---|
| Terpene Resin 1100 | 1.0 |
| d-limonene from orange processing | 3.0 |
| premix with the below composition: | 6.0 |
| Zeco 11 gilsonite | 55 |
| d-limonene | 110 |

Terpene Resin TR 1100 is a modified terpene resin sold by Arizona Chemical Company. The resulting composition was placed in contact with a clean, sanded steel plate, and showed reasonably good adhesion, was not tacky after drying, but was still somewhat soft, which allows for good film flexibility.

Example 5

A protective coating was made comprising the following ingredients, with respective parts by weight:

| | |
|---|---|
| Gum Rosin M | 340 |
| d-limonene from orange processing | 1701 |
| molybdenum sulfide solid lubricant | 300 |
| Disperse 700 | 3 |
| E-18-2 | 279 |

Disperse 700 is a dispersing agent sold by T. Goldschmidt Corporation. The mixture was sprayed on a salt and sand spreader to protect from the weather during the summer months. The resulting composition showed good adhesion, was not tacky after drying, but was still somewhat soft, which allows for good film flexibility.

Example 6

A protective coating was made comprising the following ingredients, with respective parts by weight:

| | |
|---|---|
| Soybean Oil | 0.75 |
| premix with the below composition: | 6.0 |
| Zeco 11 gilsonite | 55 |
| d-limonene | 110 |

The resulting composition was placed in contact with a clean, sanded steel plate, and showed good adhesion, was not tacky after drying, but was still somewhat soft, which allows for good film flexibility.

Examples 7 & 8

The composition of Example 6 was reproduced, but varying the amount of soybean oil, using 0.60 and 0.51 parts by weight, respectively. The resultant films, when dry, were progressively harder, but still had good adhesion and softness.

What is claimed is:

1. A useful composition for forming protective coatings for metallic equipment, said coating composition comprising:
   1) a natural-origin solvent, in the range of 25–95% by weight of the final formulation, said natural-origin solvent being a solvent derived from citrus fruit or pine tree processing, possessing approximately 95% by weight d- and/or d-l limonene, and
   2) a natural-origin or naturally-derived resin as the major hardening component, comprising from about 5% to about 50% by weight of the final formulation, said resin being gilsonite, and
   3) a naturally-derived plasticizer/softening agent such that the plasticizer to naturally-derived resinous material ratio is in the range of the range of 1 part plasticizer to 20 parts naturally-derived resinous material, to about 1 part plasticizer to 1 part naturally-derived resinous material, and the plasticizer is non-drying, said naturally-derived plasticizer/softening agents being a mixture of substantially non-drying fatty acid triglycerides, obtained from one of the natural-product processing industries, said triglyceride being an alkyl ester, wherein the fatty acids attached to glycerine are those that are produced by the plant or animal making the triglycerides.

2. The composition of claim 1, wherein the natural-origin solvent is derived from citrus fruit or pine tree processing, posessing approximately 95% by weight d- and/or d-l limonene.

3. The composition of claim 1, wherein the fatty acid portion of the plasticizer is one or more of the following acids: caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, rosin acids, dimer acids, trimer acids, ozone acids, diacids, triacids, combinations and mixtures of these.

4. The composition of claim 1 wherein the fatty acid portion of the plasticizer is made up of acids having average carbon chain lengths from about 6 to about 60.

5. A method for protecting heavy or light equipment from the elements, comprising spraying, brushing or rolling a protective coating on the equipment, utilizing any one of the coating compositions of claims 1–4.

\* \* \* \* \*